US011475914B2

(12) United States Patent
Higashino (10) Patent No.: US 11,475,914 B2
(45) Date of Patent: Oct. 18, 2022

(54) TOUCHDOWN DETECTION FOR MULTIPLE ACTUATORS ON MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yoshinari Higashino, Chigasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/195,515

(22) Filed: Mar. 8, 2021

(65) Prior Publication Data
US 2022/0093125 A1    Mar. 24, 2022

(30) Foreign Application Priority Data

Sep. 18, 2020    (JP) .............................. JP2020-157430

(51) Int. Cl.
G11B 21/02    (2006.01)
G11B 5/60    (2006.01)

(52) U.S. Cl.
CPC .......... *G11B 5/6076* (2013.01); *G11B 5/6029* (2013.01)

(58) Field of Classification Search
None
See application file for complete search history.

(56) References Cited

U.S. PATENT DOCUMENTS

| 5,355,486 | A | * | 10/1994 | Cornaby | G11B 19/02 360/77.08 |
| 5,610,808 | A | * | 3/1997 | Squires | G06F 3/0658 700/2 |
| 6,052,243 | A | * | 4/2000 | Shimada | G11B 19/04 360/25 |
| 6,819,513 | B2 | | 11/2004 | Chainer et al. | |
| 7,102,842 | B1 | * | 9/2006 | Howard | G11B 5/5521 360/61 |
| 7,508,618 | B1 | * | 3/2009 | Herbst | G11B 5/40 360/75 |
| 8,154,819 | B2 | | 4/2012 | Shin et al. | |
| 8,908,317 | B1 | | 12/2014 | Aoyagi et al. | |
| 9,830,939 | B1 | * | 11/2017 | Hamilton | G06F 3/064 |
| 10,049,691 | B1 | * | 8/2018 | Gaertner | G11B 5/4813 |
| 10,090,010 | B1 | * | 10/2018 | Erden | G11B 5/58 |

(Continued)

FOREIGN PATENT DOCUMENTS

JP    2008-186564 A    8/2008

*Primary Examiner* — K. Wong
(74) *Attorney, Agent, or Firm* — Kim & Stewart LLP (57) ABSTRACT

According to an embodiment, a controller of a magnetic disk device executes control such that detection of touchdowns of one or more first magnetic heads and detection of touchdowns of one or more second magnetic heads are executed at different timings. In addition, the controller executes control such that touchdowns of the one or more first magnetic heads are detected at different timings and touchdowns of the one or more second magnetic heads are detected at different timings.

17 Claims, 7 Drawing Sheets

(56) References Cited

U.S. PATENT DOCUMENTS

| | | | |
|---|---|---|---|
| 10,839,840 B2* | 11/2020 | Takada | G06F 3/0676 |
| 2010/0002328 A1* | 1/2010 | Sato | G11B 17/32 |
| | | | 360/31 |
| 2010/0123970 A1* | 5/2010 | Saikawa | G11B 5/59638 |
| | | | 360/75 |
| 2010/0284107 A1* | 11/2010 | Shin | G11B 5/6064 |
| | | | 360/75 |
| 2016/0365106 A1* | 12/2016 | Kojima | G11B 5/607 |

* cited by examiner

TOUCHDOWN DETECTION FOR MULTIPLE ACTUATORS ON MAGNETIC RECORDING DEVICE

CROSS-REFERENCE TO RELATED APPLICATIONS

This application is based upon and claims the benefit of priority from Japanese Patent Application No. 2020-157430, filed on Sep. 18, 2020; the entire contents of which are incorporated herein by reference.

FIELD

Embodiments described herein relate generally to a magnetic disk device and a method.

BACKGROUND

It is necessary to reduce a flying height of a magnetic head from a magnetic disk surface in order to increase a recording density of a magnetic disk driven by a magnetic disk device. A dynamic flying height (DFH) technique is sometimes used in order to reduce such a flying height of the magnetic head. In order to accurately control the flying height with this DFH technique, it is necessary to detect a state where the magnetic head is in contact with the magnetic disk. The state where the magnetic head is in contact with the magnetic disk may be referred to as a touchdown.

In addition, there is known a magnetic disk device capable of independently moving two or more magnetic heads respectively by two or more actuator systems.

DETAILED DESCRIPTION

According to the present embodiment, a magnetic disk device includes a magnetic disk, one or more first magnetic heads and one or more second magnetic heads, a first actuator system, a second actuator system, and a controller. The one or more first magnetic heads and one or more second magnetic heads record data on and read data from the magnetic disk. The first actuator system moves the one or more first magnetic heads. The second actuator system moves the one or more second magnetic heads. The controller executes control such that detection of touchdowns of the one or more first magnetic heads and detection of touchdowns of the one or more second magnetic heads are executed at different timings. In addition, the controller executes control such that touchdowns of the one or more first magnetic heads are detected at different timings and touchdowns of the one or more second magnetic heads are detected at different timings.

Hereinafter, the magnetic disk device and a method according to embodiments will be described in detail with reference to the attached drawings. Note that the present invention is not limited to the embodiments.

Embodiment

Figure 1:
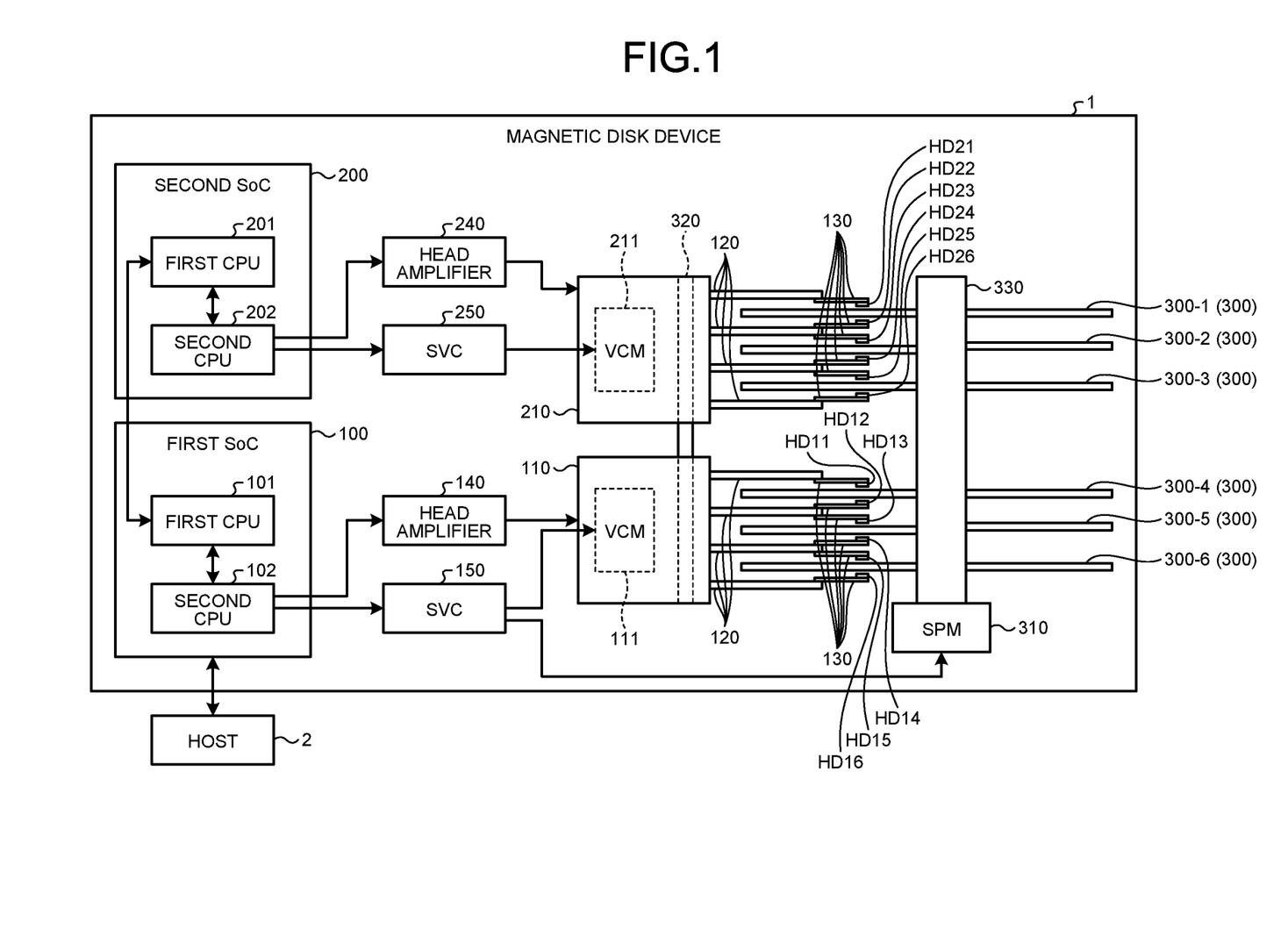
FIG. 1 is a diagram illustrating an example of a configuration of a magnetic disk device according to an embodiment.

FIG. 1 is a diagram illustrating an example of a configuration of a magnetic disk device 1 according to an embodiment. The magnetic disk device 1 can be connected to a host 2. A standard of a communication path between the magnetic disk device 1 and the host 2 is not limited to a specific standard. In one example, serial attached SCSI (SAS) can be adopted.

The host 2 corresponds to, for example, a processor, a personal computer, or a server. The magnetic disk device 1 can receive access commands (read command and write command) from the host 2.

The magnetic disk device 1 includes a plurality of magnetic disks 300 that rotate about a rotary shaft 330 of a spindle motor (SPM) 310. Here, as an example, the magnetic disk device 1 includes six magnetic disks 300-1, 300-2, 300-3, 300-4, 300-5, and 300-6. The six magnetic disks 300-1, 300-2, 300-3, 300-4, 300-5, and 300-6 are integrally rotated by the SPM 310.

Recording surfaces on which data can be recorded are formed on front surfaces and back surfaces of the six magnetic disks 300. The magnetic disk device 1 includes 12 magnetic heads HD 11 to HD 16 and HD 21 to HD 26 in order to access each of a total of 12 recording surfaces configured by the six magnetic disks 300.

The magnetic head HD 11 is provided so as to face the front surface of the magnetic disk 300-4. The magnetic head HD 12 is provided so as to face the back surface of the magnetic disk 300-4. The magnetic head HD 13 is provided so as to face the front surface of the magnetic disk 300-5. The magnetic head HD 14 is provided so as to face the back surface of the magnetic disk 300-5. The magnetic head HD 15 is provided so as to face the front surface of the magnetic disk 300-6. The magnetic head HD 16 is provided so as to face the back surface of the magnetic disk 300-6. The magnetic head HD 21 is provided so as to face the front surface of the magnetic disk 300-1. The magnetic head HD 22 is provided so as to face the back surface of the magnetic disk 300-1. The magnetic head HD 23 is provided so as to face the front surface of the magnetic disk 300-2. The magnetic head HD 24 is provided so as to face the back surface of the magnetic disk 300-2. The magnetic head HD 25 is provided so as to face the front surface of the magnetic disk 300-3. The magnetic head HD 26 is provided so as to face the back surface of the magnetic disk 300-3.

Hereinafter, the 12 magnetic heads HD 11 to HD 16 and HD 21 to HD 26 may be collectively referred to as the magnetic head HD. Each of the magnetic heads HD can access the recording surface provided on the surface of the magnetic disk 300 facing itself, that is, record data and read data.

The magnetic disk device 1 includes two actuator systems 110 and 210 that can be driven independently of each other.

The first actuator system 110 includes a voice coil motor (VCM) 111, four actuator arms 120, and six suspensions 130. Each of the six suspensions 130 provided in the first actuator system 110 supports any one of the magnetic heads HD 11 to HD 16. Each of the six suspensions 130 provided in the first actuator system 110 is attached to a distal end of any one of the four actuator arms 120.

The second actuator system 210 includes a voice coil motor (VCM) 211, four actuator arms 120, and six suspensions 130. Each of the six suspensions 130 provided in the second actuator system 210 supports any one of the magnetic heads HD 21 to HD 26. Each of the six suspensions 130 provided in the second actuator system 210 is attached to a distal end of any one of the four actuator arms 120.

The two actuator systems 110 and 210 can rotate about a rotary shaft 320. The rotary shaft 320 is provided at a position parallel to the rotary shaft 330 and separated from the rotary shaft 330. The VCM 111 can rotate the first actuator system 110 within a predetermined range about the rotary shaft 320. The VCM 211 can rotate the second actuator system 210 within a predetermined range about the rotary shaft 320. Accordingly, the first actuator system 110 can move the magnetic heads HD 11 to HD 16 relative to the recording surfaces of the magnetic disks 300-4 to 300-6 in the radial direction. The second actuator system 210 can move the magnetic heads HD 21 to HD 26 relative to the recording surfaces of the magnetic disks 300-1 to 300-3 in the radial direction.

Figure 2:
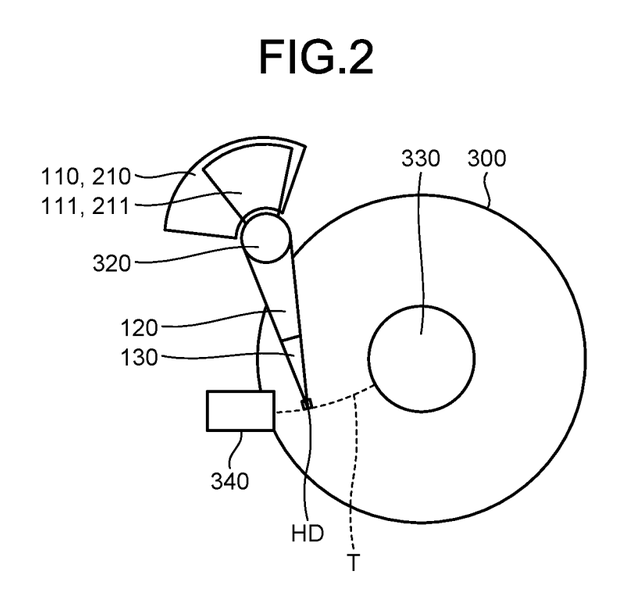
FIG. 2 is a view for describing a positional relationship between two actuator systems and a magnetic disk according to the embodiment.

FIG. 2 is a view for describing a positional relationship between the actuator systems 110 and 210 and the magnetic disk 300 according to the embodiment. As illustrated in this drawing, the actuator systems 110 and 210 moves the magnetic head HD relative to the recording surface of the magnetic disk 300 along a locus T. Note that the magnetic disk device 1 is provided with a ramp load mechanism 340 for parking each magnetic head HD on the locus T near an outer end of the magnetic disk 300.

The description will be given with reference to FIG. 1 again.

The magnetic disk device 1 further includes a first system-on-a-chip (SoC) 100, a second SoC 200, head amplifiers 140 and 240, and servo controllers (SVC) 150 and 250.

The head amplifier 140 amplifies a signal, read from the magnetic disk 300 by the magnetic heads HD 11 to HD 16 (more specifically, read elements 402 provided in the magnetic heads HD 11 to HD 16), and output and supply the amplified signal to the first SoC 100. In the first SoC 100, the signal supplied from the head amplifier 140 is demodulated into digital data by a read channel circuit (not illustrated).

In addition, a signal corresponding to the digital data is supplied from the first SoC 100 to the head amplifier 140. The head amplifier 140 amplifies the signal supplied from the first SoC 100 and supply the amplified signal to the magnetic heads HD 11 to HD 16 (more specifically, write elements 401 provided in the magnetic heads HD 11 to HD 16). The write element 401 having received the signal records the signal on the recording surface of the magnetic disk 300.

In addition, the head amplifier 140 detects touchdowns of the magnetic heads HD 11 to HD 16 in response to an instruction from the first SoC 100.

The head amplifier 240 amplifies a signal, read from the magnetic disk 300 by the magnetic heads HD 21 to HD 26 (more specifically, read elements 402 provided in the magnetic heads HD 21 to HD 26), and output and supply the amplified signal to the second SoC 200. In the second SoC 200, the signal supplied from the head amplifier 240 is demodulated into digital data by a read channel circuit (not illustrated).

In addition, a signal corresponding to the digital data is supplied from the second SoC 200 to the head amplifier 240. The head amplifier 240 amplifies the signal supplied from the second SoC 200 and supply the amplified signal to the magnetic heads HD 21 to HD 26 (more specifically, write elements 401 provided in the magnetic heads HD 21 to HD 26). The write element 401 having received the signal records the signal on the recording surface of the magnetic disk 300.

In addition, the head amplifier 240 detects touchdowns of the magnetic heads HD 21 to HD 26 in response to an instruction from the second SoC 200.

The SVC 150 drives the first actuator system 110 based on an instruction from the first SoC 100. Specifically, the SVC 150 drives the first actuator system 110 to position the magnetic head HD to be used among the magnetic heads HD 11 to HD 16 at a position instructed by the first SoC 100.

In addition, the SVC 150 also drives the SPM 310 based on an instruction from the first SoC 100. The SVC 150 drives the SPM 310 such that a rotational speed of the SPM 310 is constant at a predetermined target speed.

The SVC 250 drives the second actuator system 210 based on an instruction from the second SoC 200. Specifically, the SVC 250 drives the second actuator system 210 to position the magnetic head HD to be used among the magnetic heads HD 21 to HD 26 at a position instructed by the second SoC 200.

The first SoC 100 is connected to the host 2. The first SoC 100 interprets an access command from the host 2 and executes control to perform an operation based on the interpretation result, such as accessing the magnetic disk 300.

The first SoC 100 includes a first central processing unit (CPU) 101 and a second CPU 102. The first CPU 101 and the second CPU 102 operate according to a firmware program. The firmware program is stored in a predetermined non-volatile storage area. The predetermined non-volatile storage area may be the magnetic disk 300 or a read only memory (ROM) (not illustrated).

The first CPU 101 controls the overall operation of the magnetic disk device 1 together with the first CPU 201 provided in the second SoC 200. The first CPU 101 sends various instructions to the second CPU 102 as a part of control of the overall operation of the magnetic disk device 1. The various instructions from the first CPU 101 to the second CPU 102 include a rotation control instruction of the SPM 310, a load/unload instruction of the first actuator system 110, a touchdown measurement instruction for the first actuator system 110, and the like. In addition, the various instructions from the first CPU 101 to the second CPU 102 include an instruction for accessing the magnetic disk 300 via the magnetic heads HD 11 to HD 16.

The second CPU 102 executes an operation instructed by the first CPU 101. The second CPU 102 controls the head amplifier 140, the SVC 150, or the both in order to implement the instructed operation.

The second SoC 200 includes a first CPU 201 and a second CPU 202. The first CPU 201 and the second CPU 202 operate according to a firmware program. The firmware program is stored in a predetermined non-volatile storage area. The predetermined non-volatile storage area may be a magnetic disk 300 or a ROM (not illustrated).

The first CPU 201 controls the overall operation of the magnetic disk device 1 together with the first CPU 101 provided in the first SoC 100. The first CPU 201 sends various instructions to the second CPU 202 as a part of control of the overall operation of the magnetic disk device 1. The various instructions from the first CPU 201 to the second CPU 202 include a load/unload instruction of the second actuator system 210, a touchdown measurement instruction using the second actuator system 210, and the like. In addition, the various instructions from the first CPU 201 to the second CPU 202 include an instruction for accessing the magnetic disk 300 via the magnetic heads HD 21 to HD 26.

The second CPU 202 executes an operation instructed by the first CPU 201. The second CPU 202 controls the head amplifier 240, the SVC 250, or the both in order to implement the instructed operation.

Note that the first SoC 100 and the second SoC 200 are examples of a controller in the claims. One of the first SoC 100 and the second SoC 200 is an example of a first controller chip in the claims. The other one of the first SoC 100 and the second SoC 200 is an example of a second controller chip in the claims. An actuator system controlled by the first controller chip among the actuator systems 110 and 210 is an example of a first actuator system in the claims. An actuator system controlled by the second controller chip among the actuator systems 110 and 210 is an example of a second actuator system in the claims.

Hereinafter, a description will be given assuming that the first SoC 100 is the first controller chip, the second SoC 200 is the second controller chip, the first actuator system 110 is the first actuator system, and the second actuator system 210 is the second actuator system.

Figure 3:
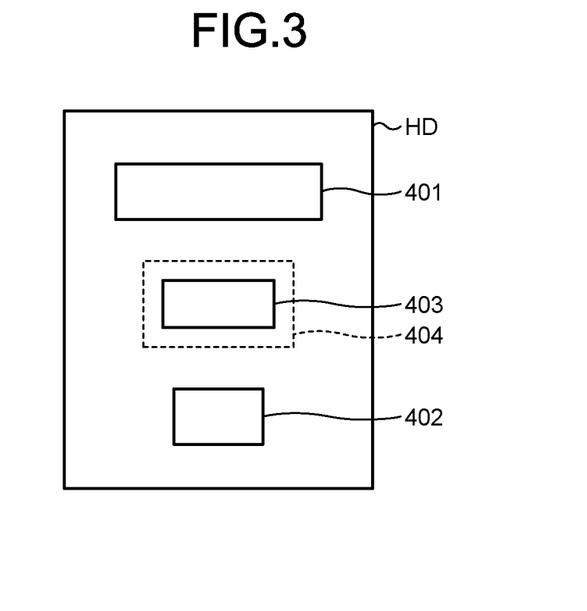
FIG. 3 is a view illustrating a configuration of a magnetic head according to the embodiment as viewed from a recording surface side of the magnetic disk.
Figure 4:
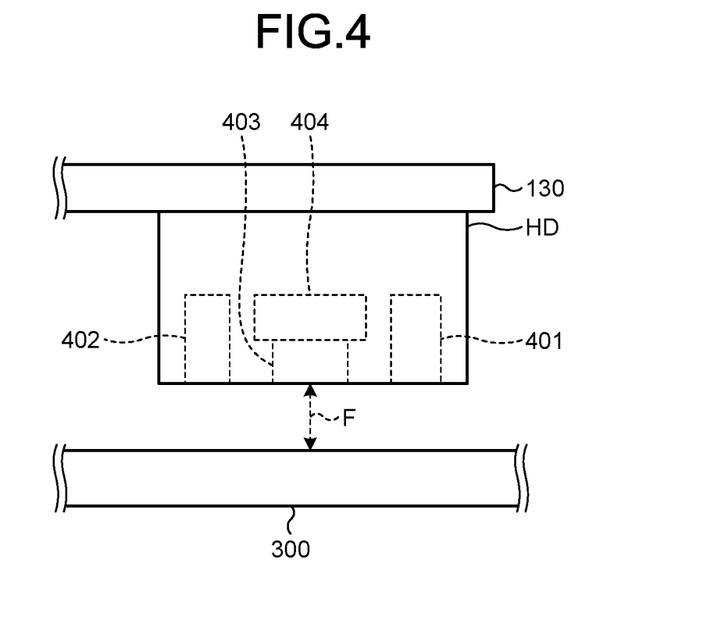
FIG. 4 is a cross-sectional view of the magnetic head according to the embodiment cut along an extending direction of a suspension.

Subsequently, a configuration of the magnetic head HD according to the embodiment will be described. FIG. 3 is a view illustrating the configuration of the magnetic head HD according to the embodiment as viewed from the recording surface side of the magnetic disk 300. FIG. 4 is a cross-sectional view of the magnetic head HD according to the embodiment cut along an extending direction of the suspension 130.

As illustrated in FIGS. 3 and 4, the magnetic head HD includes the write element 401, the read element 402, a head-disk interface (HDI) sensor 403, and a heater 404.

The write element 401 records data on the recording surface of the magnetic disk 300 by a magnetic field generated from a magnetic pole thereof. The read element 402 reads a change in the magnetic field on the magnetic disk 300 as data to read the data recorded on the magnetic disk 300.

The HDI sensor 403 includes a resistive element (not illustrated). With this resistive element, it is possible to detect the contact between the magnetic head HD and the magnetic disk 300. More specifically, when the magnetic head HD comes into contact with the magnetic disk 300, the HDI sensor 403 undergoes a thermal change due to the influence of frictional heat at the time of the contact therebetween. As a result, a resistance value of the resistive element changes. As the change in the resistance value of the resistive element is detected by the head amplifiers 140 or 240, the contact between the magnetic head HD and the magnetic disk 300 is detected.

The heater 404 is supplied with power from the head amplifiers 140 or 240 to heat the magnetic head HD. Since the magnetic head HD is thermally deformed by this heating, a flying height F of the magnetic head HD from the magnetic disk 300 changes. More specifically, the thermal expansion of the magnetic head HD increases as the power supplied to the heater 404 increases, which reduces the flying height F.

During touchdown measurement, the power supplied to the heater 404 is gradually increased under the control of the head amplifiers 140 or 240 by the second CPUs 102 or 202. The magnetic head HD expands as the power supplied to the heater 404 increases, which reduces the flying height F. Further, when the flying height F becomes zero, the contact between the magnetic head HD and the magnetic disk 300 is detected by the head amplifiers 140 or 240 based on the change in the resistance value of the resistive element of the HDI sensor 403. That is, the touchdown is detected. The second CPUs 102 or 202 record the power supplied to the heater 404 when the touchdown is detected. As a result, the touchdown measurement for one magnetic head HD ends.

In other words, the touchdown measurement is to measure the power supplied to the heater 404, which is required to cause a touchdown (a state where the magnetic head HD and the magnetic disk 300 are in contact with each other). After the touchdown measurement, the power supplied to the heater 404 is controlled with a power value acquired by the touchdown measurement as a reference (reference power) when the magnetic head HD is used to access the recording surface of the magnetic disk 300. If the touchdown can be detected with high accuracy, the accuracy of the reference power is improved, and thus, the accuracy of control of the flying height F is improved.

The touchdown measurement is executed for each of the 12 magnetic heads HD.

As described above, the touchdown measurement involves the contact between the magnetic head HD and the magnetic disk 300. Due to the contact between the magnetic head HD and the magnetic disk 300, a disturbance is applied to the rotation of the magnetic disk 300.

The magnetic head HD is levitated by a lift force generated by the relative speed between the magnetic disk 300 and the magnetic head HD. That is, the flying height F of the magnetic head HD is affected by a rotational speed of the magnetic disk 300. Accordingly, if the touchdown measurement is performed for another magnetic head HD in a state where the disturbance is applied to the rotation of the magnetic disk 300, the flying height F of the other magnetic head HD fluctuates due to the disturbance applied to the rotation of the magnetic disk 300, and thus, the touchdown detection accuracy of the other magnetic head HD deteriorates. As a result, it is difficult to accurately measure a reference power applied to the other magnetic head HD.

Therefore, touchdown measurement for the six magnetic heads HD are individually and sequentially performed in one actuator system between the two actuator systems 110 and 210 in the embodiment. When the touchdown measurement for all the magnetic heads HD in the one actuator system is completed, the touchdown measurement of the six magnetic heads HD are individually and sequentially performed in the other actuator system between the two actuator systems 110 and 210.

Accordingly, touchdowns of two magnetic heads HD are prevented from occurring at the same time, and thus, the touchdown detection accuracy of each magnetic head HD is improved.

The first CPU 101 and the first CPU 201 are electrically connected such that communication between the first CPU 101 and the first CPU 201 is possible in order to control a touchdown measurement timing for each of the actuator systems 110 and 210.

Figure 5:
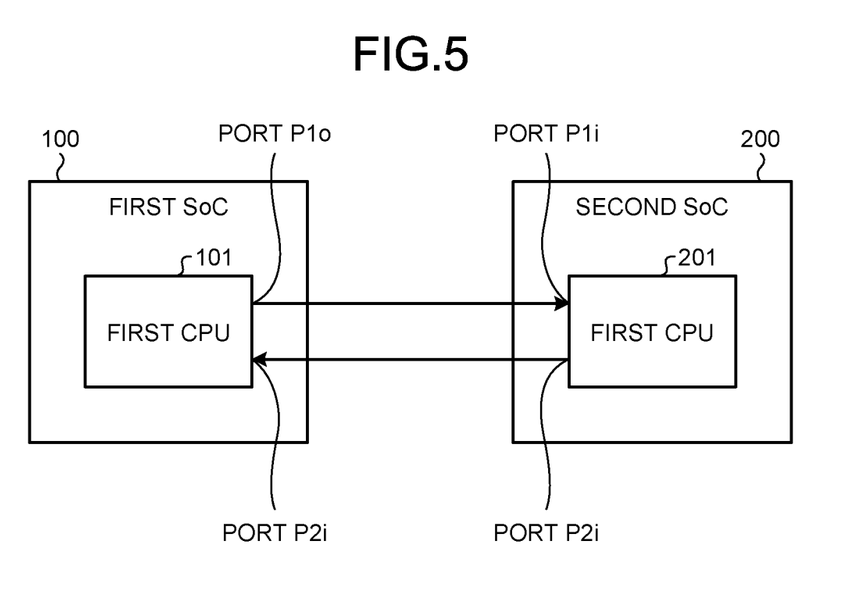
FIG. 5 is a schematic diagram for describing a connection example according to the embodiment between a first CPU included in a first SoC and a first CPU included in a second SoC.

FIG. 5 is a schematic view for describing a connection example according to the embodiment between the first CPU 101 and the first CPU 201. Each of the first CPU 101 and the first CPU 201 has two ports P1 and P2. Each of the ports P1 and P2 is a terminal configured to transmit and receive a 1-bit signal as an example here.

The port P1 (referred to as a port P1o) provided in the first CPU 101 is connected to the port P1 (referred to as a port P1i) provided in the first CPU 201. The first CPU 101 transmits a 1-bit signal to the first CPU 201 via the port P1o. The port P1i provided in the first CPU 201 includes a latch circuit (not illustrated), and takes (in other words, latch) the 1-bit signal output from the port P1o of the first CPU 101.

The port P2 (referred to as a port P2i) provided in the first CPU 101 is connected to the port P2 (port P2o) provided in the first CPU 201. The first CPU 201 transmits a 1-bit signal to the first CPU 101 via the port P2o. The port P2i provided in the first CPU 101 includes a latch circuit (not illustrated), and takes the 1-bit signal output from the port P2o of the first CPU 201.

In this manner, the signal from the first CPU 101 to the first CPU 201 is transferred via the port P1 provided in each of the first CPUs 101 and 201, and the signal from the first CPU 201 to the first CPU 101 is transferred via the port P2 provided in each of the first CPUs 101 and 201.

The first CPUs 101 and 201 transmit and receive the signals using the two ports P1 and P2 to control the touchdown measurement timing.

Figure 6:
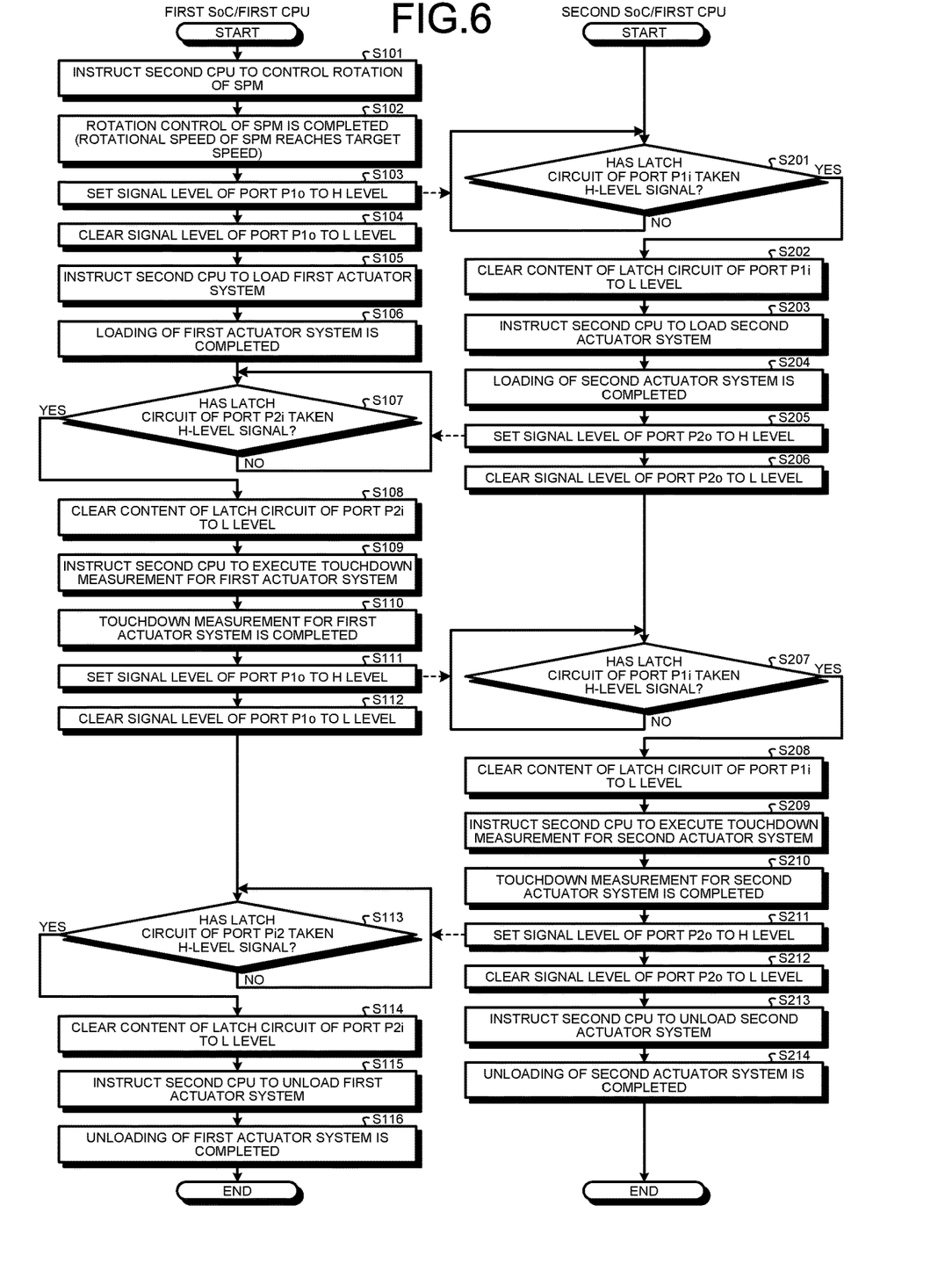
FIG. 6 is a flowchart for describing an example of an operation related to touchdown measurement in the magnetic disk device according to the embodiment.

FIG. 6 is a flowchart for describing an example of an operation related to the touchdown measurement in the magnetic disk device 1 according to the embodiment.

First, in the first SoC 100, the first CPU 101 instructs the second CPU 102 to control the rotation of the SPM 310 (S101). Specifically, the first CPU 101 instructs the second CPU 102 to control the rotation of the SPM 310. The second CPU 102 uses the SVC 150 to execute speed control for accelerating the rotational speed of the SPM 310 to a target speed in response to the instruction from the first CPU 101.

When the rotational speed of the SPM 310 reaches the target speed, the rotation control of the SPM 310 is completed (S102). Thereafter, the second CPU 102 uses the SVC 150 to execute control such that the rotational speed of the SPM 310 is constant at the target speed.

When the rotational speed of the SPM 310 reaches the target speed, it is possible to load the actuator systems 110 and 210 (more accurately, load the 12 magnetic heads HD connected to the actuator systems 110 and 210). The first CPU 101 notifies the first CPU 201 that loading of the second actuator system 210 becomes possible by communication via the port P1.

Specifically, in the second SoC 200, the first CPU 201 starts monitoring the content of the latch circuit of the port P1i after the start. The first CPU 201 repeats the determination on whether the latch circuit of the port P1i has taken an H-level signal (S201) until the latch circuit of the port P1i takes the H-level signal (S201: No).

The first SoC 100 sets a signal level of the port P1o from an L level to the H level (S103), and then, clears the signal level of the port P1o to the L level (S104).

In the second SoC 200, the H-level signal is taken into the latch circuit of the port P1i according to the processing of S103, and the first CPU 201 determines that the latch circuit of the port P1i has taken the H-level signal (S201: Yes). As a result, the first CPU 201 can recognize that loading of the second actuator system 210 becomes possible. When determining that the latch circuit of the port P1i has taken the H-level signal (S201: Yes), the first CPU 201 clears the content of the latch circuit of the port P1i to the L level (S202).

In this manner, after the rotation control of the SPM 310 is completed, the first CPU 101 notifies the first CPU 201 that loading of the second actuator system 210 becomes possible by the first communication using the port P1.

In the first SoC 100, the first CPU 101 instructs the second CPU 102 to load the first actuator system 110 (S105). The second CPU 102 uses the SVC 150 to control the VCM 111 in response to the instruction from the first CPU 101, thereby loading the first actuator system 110. As a result, the magnetic heads HD 11 to HD 16 are moved from the ramp load mechanism 340 onto the recording surfaces of the magnetic disks 300-4, 300-5, and 300-6.

When the loading of the first actuator system 110 is completed (S106), the first CPU 101 waits for the completion of loading of the second actuator system 210.

In the second SoC 200, the first CPU 201 instructs the second CPU 202 to load the second actuator system 210 (S203). The second CPU 202 uses the SVC 250 to control the VCM 211 in response to the instruction from the first CPU 201, thereby loading the second actuator system 210. As a result, the magnetic heads HD 21 to HD 26 are moved from the ramp load mechanism 340 onto the recording surfaces of the magnetic disks 300-1, 300-2, and 300-3.

When the loading of the second actuator system 210 is completed (S204), the first CPU 201 notifies the first CPU 101 that the loading of the second actuator system 210 has been completed by communication via the port P2.

Specifically, in the first SoC 100, the monitoring of the content of the latch circuit of the port P2i is started after the processing of S106. That is, the first CPU 101 repeats the determination on whether the latch circuit of the port P2i has taken the H-level signal (S107) until the latch circuit of the port P2i takes the H-level signal (S107: No).

In the second SoC 200, after the processing of S204, the first CPU 201 sets a signal level of the port P2o from the L level to the H level (S205), and then, clears the signal level of the port P2o to the L level (S206).

In the first SoC 100, the H-level signal is taken into the latch circuit of the port P2i according to the processing of S205, and the first CPU 101 determines that the latch circuit of the port P2i has taken the H-level signal (S107: Yes). As a result, the first CPU 101 can recognize that the loading of the second actuator system 210 has been completed. When determining that the latch circuit of the port P2i has taken the H-level signal (S107: Yes), the first CPU 101 clears the content of the latch circuit of the port P2i to the L level (S108).

In this manner, the first CPU 201 notifies the first CPU 101 that the loading of the second actuator system 210 has been completed by the first communication using the port P2.

Subsequently, the touchdown measurement is executed. In this example, first, the touchdown measurement for the first actuator system 110 is executed. Note that a configuration may be adopted in which the touchdown measurement for the second actuator system 210 is executed prior to the touchdown measurement for the first actuator system 110.

The first CPU 101 instructs the second CPU 102 to execute the touchdown measurement for the first actuator system 110 (S109). The second CPU 102 sequentially controls the six magnetic heads HD 11 to HD 16 using the head amplifier 140 in response to the instructions from the first CPU 101, thereby serially executes the touchdown measurement on the six magnetic heads HD 11 to HD 16.

When the touchdown measurement for the first actuator system 110 is completed (S110), the first CPU 101 notifies the first CPU 201 that the touchdown measurement can be started by communication via the port P1.

Specifically, in the second SoC 200, the first CPU 201 starts monitoring the content of the latch circuit of the port P1*i* after the processing of S206. That is, the first CPU 201 repeats the determination on whether the latch circuit of the port P1*i* has taken the H-level signal (S207) until the latch circuit of the port P1*i* takes the H-level signal (S207: No).

In the first SoC 100, the first CPU 101 sets a signal level of the port P1*o* from the L level to the H level (S111), and then, clears the signal level of the port P1*o* to the L level (S112).

In the second SoC 200, the H-level signal is taken into the latch circuit of the port P1*i* according to the processing of S111, and the first CPU 201 determines that the latch circuit of the port P1*i* has taken the H-level signal (S207: Yes). As a result, the first CPU 201 can recognize that loading of the touchdown measurement becomes possible. When determining that the latch circuit of the port P1*i* has taken the H-level signal (S207: Yes), the first CPU 201 clears the content of the latch circuit of the port P1*i* to the L level (S208).

In this manner, the first CPU 101 notifies the first CPU 201 that the touchdown measurement for the second actuator system 210 becomes possible by the second communication using the port P1.

After notifying that the touchdown measurement for the second actuator system 210 becomes possible, the first CPU 101 waits for the completion of the touchdown measurement for the second actuator system 210.

In the second SoC 200, the first CPU 201 instructs the second CPU 202 to execute the touchdown measurement for the second actuator system 210 (S209). The second CPU 202 sequentially controls the six magnetic heads HD 21 to HD 26 using the head amplifier 240 in response to the instructions from the first CPU 201, thereby serially executes the touchdown measurement on the six magnetic heads HD 21 to HD 26.

When the touchdown measurement for all the magnetic heads HD connected to the second actuator system 210 is completed (S210), the first CPU 201 notifies the first CPU 101 that the touchdown measurement has been completed by communication via the port P2.

Specifically, in the first SoC 100, the first CPU 101 starts monitoring the content of the latch circuit of the port P2*i* after the processing of S112. That is, the first CPU 101 repeats the determination on whether the latch circuit of the port P2*i* has taken the H-level signal (S113) until the latch circuit of the port P2*i* takes the H-level signal (S113: No).

In the second SoC 200, after the processing of S210, the first CPU 201 sets a signal level of the port P2*o* from the L level to the H level (S211), and then, clears the signal level of the port P2*o* to the L level (S212).

In the first SoC 100, the H-level signal is taken into the latch circuit of the port P2*i* according to the processing of S211, and the first CPU 101 determines that the latch circuit of the port P2*i* has taken the H-level signal (S113: Yes). As a result, the first CPU 101 can recognize that the touchdown measurement for the second actuator system 210 has been completed. When determining that the latch circuit of the port P2*i* has taken the H-level signal (S113: Yes), the first CPU 101 clears the content of the latch circuit of the port P2*i* to the L level (S114).

In this manner, the first CPU 201 notifies the first CPU 101 that the touchdown measurement for the second actuator system 210 has been completed by the second communication using the port P2.

When the touchdown measurement for the actuator systems 110 and 210 is completed, the actuator systems 110 and 210 are unloaded.

In the first SoC 100, the first CPU 101 instructs the second CPU 102 to unload the first actuator system 110 (S115). The second CPU 102 uses the SVC 150 to control the VCM 111 in response to the instruction from the first CPU 101, thereby unloading the first actuator system 110. As a result, the magnetic heads HD 11 to HD 16 are retracted to the ramp load mechanism 340. When the unloading of the first actuator system 110 is completed (S116), the operation of the first CPU 101 related to the touchdown measurement ends.

In the second SoC 200, the first CPU 201 instructs the second CPU 202 to unload the second actuator system 210 (S213). The second CPU 202 uses the SVC 250 to control the VCM 211 in response to the instruction from the first CPU 201, thereby unloading the second actuator system 210. As a result, the magnetic heads HD 21 to HD 26 are retracted to the ramp load mechanism 340. When the unloading of the second actuator system 210 is completed (S214), the operation of the second CPU 202 related to the touchdown measurement ends.

Figure 7:
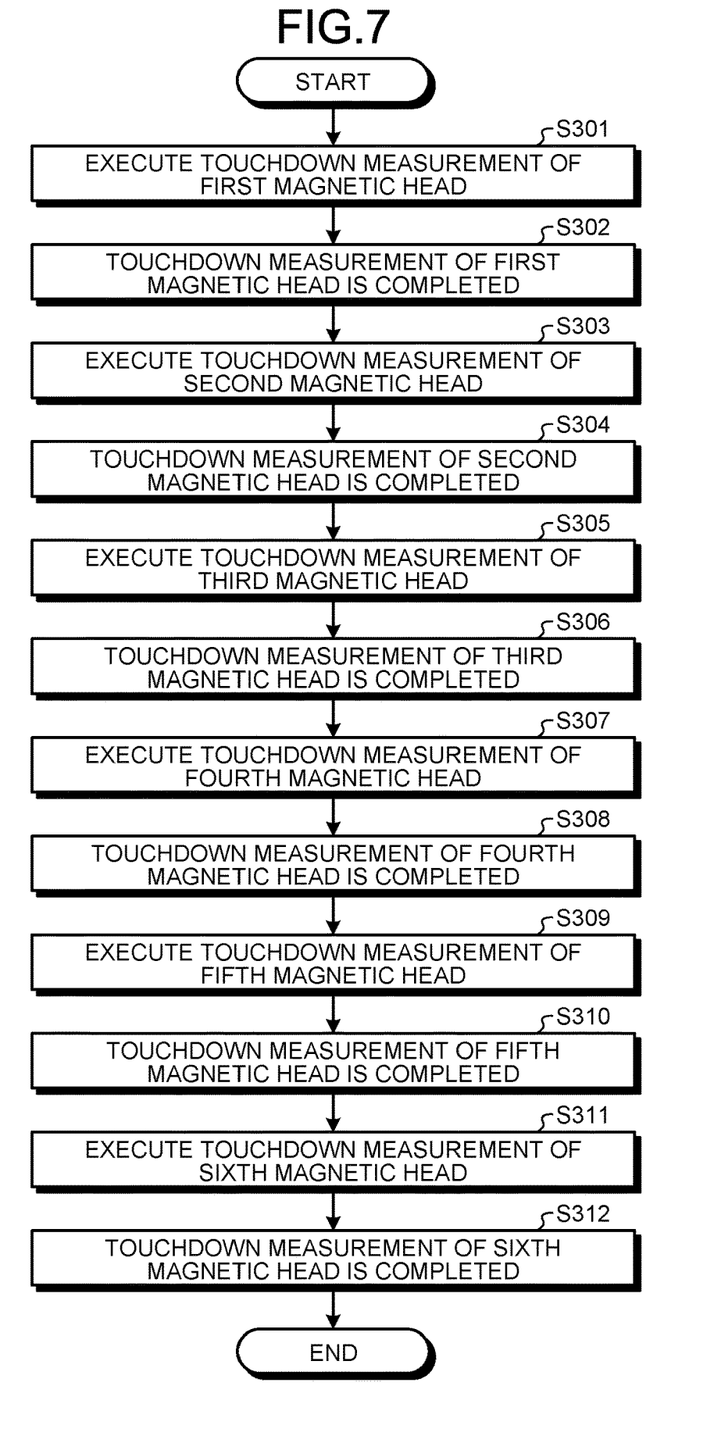
FIG. 7 is a flowchart for describing details of a touchdown measurement operation in each of the actuator systems according to the embodiment.

FIG. 7 is a flowchart for describing details of a touchdown measurement operation in each of the actuator systems 110 and 210 according to the embodiment.

In each of the actuator systems 110 and 210, the same operation is performed except that the CPUs that execute control, the head amplifiers used for the control, and the magnetic heads HD to be controlled are different from each other. Here, as a representative, the touchdown measurement operation in the first actuator system 110 will be described.

First, the second CPU 102 uses the head amplifier 140 to execute touchdown measurement of the first magnetic head HD among the six magnetic heads HD 11 to HD 16 (S301). The first magnetic head HD can be arbitrarily determined by a designer.

In the S301, the second CPU 102 uses the head amplifier 140 to start supplying power to the heater 404 of the first magnetic head HD, and gradually increases the supplied power. When a touchdown of the first magnetic head HD occurs, the head amplifier 140 detects the touchdown based on a signal from the HDI sensor 403. The head amplifier 140 notifies the second CPU 102 that the touchdown has been detected. The second CPU 102 records the power supplied to the heater 404 at the timing when the touchdown has been detected as reference power applied to the first magnetic head HD. Further, the second CPU 102 stops the supply of power to the heater 404.

When the touchdown measurement of the first magnetic head HD, that is, the acquisition of the reference power applied to the first magnetic head HD, is completed (S302), the second CPU 102 executes touchdown measurement of the second magnetic head HD among the six magnetic heads HD 11 to HD 16 (S303). The touchdown measurement of the second magnetic head HD is performed in the same procedure as the touchdown measurement of the first magnetic head HD.

When the touchdown measurement of the second magnetic head HD, that is, the acquisition of the reference power applied to the second magnetic head HD, is completed (S304), the second CPU 102 executes touchdown measurement of the third magnetic head HD among the six magnetic heads HD 11 to HD 16 (S305). The touchdown measurement of the third magnetic head HD is performed in the same procedure as the touchdown measurement of the first magnetic head HD.

When the touchdown measurement of the third magnetic head HD is completed (S306), touchdown measurement for the fourth, fifth, and sixth magnetic heads HD are executed sequentially and serially in the same procedure as the touchdown measurement of the first magnetic head HD in the subsequent S307 to S312.

When the touchdown measurement of the sixth magnetic head HD is completed (S312), the touchdown measurement in the first actuator system 110 is completed.

The touchdown measurement of each magnetic head HD is executed using the signal from the HDI sensor 403 as above. A method of the touchdown measurement is not limited thereto. For example, as disclosed in Japanese Patent Application Laid-Open No. 2008-186564, a method of detecting a touchdown based on an error rate of data read from the magnetic disk 300 is applicable to the embodiment.

In addition, a communication method between the first CPU 101 and the first CPU 201 is not limited only to the method using the ports P1 and P2. A memory may be arranged between the first CPU 101 and the first CPU 201 to transmit and receive information between the first CPU 101 and the first CPU 201 via the memory. In addition, the first CPU 101 and the first CPU 201 may be connected by a communication line capable of transmitting and receiving a signal in both directions to perform communication via the communication line.

Figure 8:
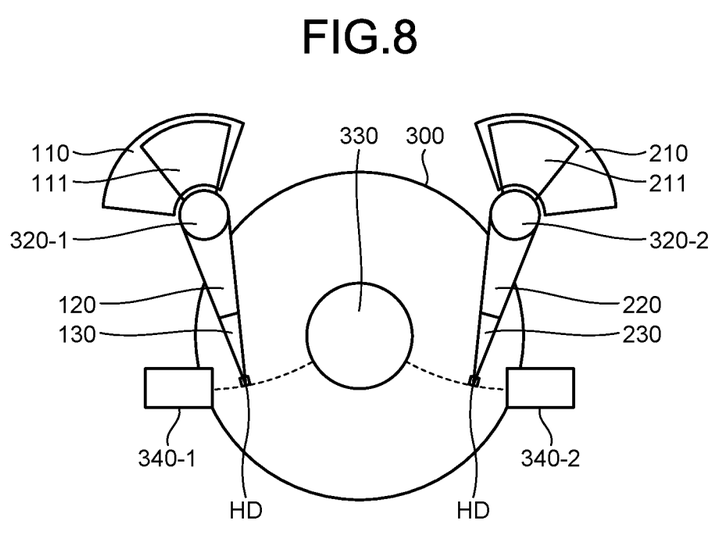
FIG. 8 is a view for describing another example of the positional relationship between the two actuator systems and the magnetic disk according to the embodiment.

In addition, the case where both the actuator systems 110 and 210 are configured to be rotatable about the same rotary shaft 320 has been described above. The embodiment is also applicable to a magnetic disk device in which the actuator systems 110 and 210 are configured to be rotatable about different rotary shafts 320-1 and 320-2, for example, as illustrated in FIG. 8. In the example illustrated in FIG. 8, a magnetic head HD of the first actuator system 110 is unloaded to a ramp load mechanism 340-1, and a magnetic head HD of the second actuator system 210 is unloaded to a ramp load mechanism 340-2.

In addition, the number of the magnetic disks 300 provided in the magnetic disk device 1 is not limited to six.

In addition, the number of the magnetic heads HD provided in the magnetic disk device 1 is not limited to twelve. For example, the magnetic disk device 1 can include one or more magnetic heads HD which are moved by the first actuator system 110, and one or more magnetic heads HD which are moved by the second actuator system 210.

In addition, the number of the actuator systems provided in the magnetic disk device 1 is not limited to two. When the magnetic disk device 1 has three or more actuator systems, at least two of the three or more actuator systems can function as a pair of the first actuator system and the second actuator system according to the embodiment.

As described above, according to the embodiment, the first SoC 100 and the second SoC 200, which serve as the controller, execute control together such that the touchdown measurement, more specifically, the touchdown detection, of the first actuator system 110 and the touchdown measurement, more specifically, the touchdown detection, of the second actuator system 210 are executed at different timings. Further, the first SoC 100 and the second SoC 200, which serve as the controller, execute control such that touchdowns of the respective magnetic heads HD moved by the first actuator system 110 are measured at different timings in the touchdown measurement for the first actuator system 110. In addition, the first SoC 100 and the second SoC 200, which serve as the controller, execute control such that touchdowns of the respective magnetic heads HD moved by the second actuator system 210 are measured at different timings in the touchdown measurement for the second actuator system 210.

As a result, touchdowns of two magnetic heads HD are prevented from occurring at the same time, and thus, the touchdown detection accuracy of each magnetic head HD is improved.

In addition, according to the embodiment, the first SoC 100 executes the touchdown measurement for all the magnetic heads HD moved by the first actuator system 110. Further, the second SoC 200 executes the touchdown measurement for all the magnetic head HD moved by the second actuator system 210 after the touchdown measurement for all the magnetic heads HD moved by the first actuator system 110 is completed.

As a result, touchdowns of two magnetic heads HD are prevented from occurring at the same time, and thus, the touchdown detection accuracy of each magnetic head HD is improved.

Note that the touchdown measurement of the magnetic head HD moved by the first actuator system 110 and the touchdown measurement of the magnetic head HD moved by the second actuator system 210 may be executed alternately in units of magnetic head HD. In such a case, it becomes necessary for each of the first CPU 101 and the second CPU 201 to transmit and receive a notification to control the touchdown measurement timing each time the touchdown measurement of one magnetic head HD is completed between the first CPU 101 and the second CPU 201.

In the embodiment, the touchdown measurement for all the magnetic heads HD moved by the second actuator system 210 is executed after the touchdown measurement for all the magnetic heads HD moved by the first actuator system 110 is completed. Accordingly, the number of times of transmitting and receiving the notification to control the touchdown measurement timing is only twice. In the example illustrated in FIG. 6, the notification is transmitted and received by the processing of S111 and the processing of S211.

In addition, according to the embodiment, the first SoC 100 and the second SoC 200, which serve as the controller, execute control such that the touchdown measurement is executed in the state where the actuator systems 110 and 210 are loaded together.

When the actuator systems are loaded, the windage loss of the SPM 310 increases as the magnetic head HD faces the recording surface of the magnetic disk 300. As a result, the power consumption of the SPM 310 increases. Therefore, for example, by unloading one of the actuator systems 110 and 210 when the touchdown measurement is being executed in the other of the actuator systems 110 and 210, the power consumption of the SPM 310 can be reduced.

On the other hand, the windage loss of the SPM 310 caused by the loading of the actuator system gives a static disturbance to the rotation of the magnetic disk 300.

In the actual magnetic disk device 1, a use case is assumed in which the two actuator systems 110 and 210 are used in parallel to access the magnetic disk 300. Since the two actuator systems 110 and 210 are used in parallel, the number of accesses to the magnetic disk 300 per unit time can be improved as compared to a case where the actuator systems 110 and 210 are used exclusively.

In the above use case, the actuator systems 110 and 210 are used in the loaded state, and thus, a larger disturbance is applied to the rotation of the magnetic disk 300 as compared to a case where only one of the actuator systems 110 and 210 is loaded. That is, the flying height F of each magnetic head HD is controlled in a state where the large disturbance due to the actuator systems 110 and 210 being loaded together is applied to the rotation of the magnetic disk 300.

In the embodiment, the touchdown measurement is executed in the state where the actuator systems 110 and 210 are loaded together. That is, the touchdown measurement is executed under the most unfavorable condition within the range of assumed disturbance conditions. As a result, the magnetic disk device 1 uses the two actuator systems 110 and 210 in parallel to access the magnetic disk 300 so that it is possible to accurately control the flying height F even when the disturbance conditions deteriorate.

Note that the first SoC 100 and the second SoC 200, which serve as the controller, may execute control such that the touchdown measurement for one of the actuator systems 110 and 210 is executed while executing seek control using the other of the actuator systems 110 and 210 in order to execute the touchdown measurement under an even more unfavorable condition within the range of assumed disturbance conditions.

In addition, in the above description, the first SoC 100 and the second SoC 200, which serve as the controller, execute unloading of the actuator systems 110 and 210 after the touchdown measurement for all the magnetic heads HD moved by the first actuator system 110 and the touchdown measurement for all the magnetic heads HD moved by the second actuator system 210 are completed. The controller may be configured to unload the actuator system 110, and then, unload the actuator system 210. In such a case, the first SoC 100 unloads the actuator system 110, and sends a notification to the second SoC 200 in the same procedure as S103, S104, S201, S202, and the like after the unloading of the actuator system 110 is completed. When receiving the notification, the second SoC 200 starts unloading the actuator system 210. Note that the unloading order is not limited thereto.

The controller may be configured to load the actuator system 110, and then, load the actuator system 210 similarly to unloading. In such a case, the first SoC 100 loads the actuator system 110, and sends a notification to the second SoC 200 in the same procedure as S103, S104, S201, S202, and the like after the loading of the actuator system 110 is completed. When receiving the notification, the second SoC 200 starts loading the actuator system 210. Note that the loading order is not limited thereto.

Since the loading/unloading of the actuator systems 110 and 210 are executed at different timings between the actuator systems as described above, it is possible to suppress the disturbance caused by loading/unloading. In addition, it is possible to reduce a vibration or an impact generated in the magnetic disk device 1 by loading/unloading. For example, in a manufacturing plant of the magnetic disk device 1 or a data center using the magnetic disk device 1, a plurality of the magnetic disk devices 1 are operated in a state where the plurality of magnetic disk devices 1 are housed in a pallet. In such a case, the vibration or impact generated in each of the magnetic disk devices 1 affects the operation of other magnetic disk device 1. Since the vibration or impact generated in each of the magnetic disk devices 1 can be reduced by executing the loading/unloading of the actuator systems 110 and 210 at different timings, it is possible to reduce the influence of each of the magnetic disk devices 1 on the operation of the other magnetic disk device 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
one or more magnetic disks;
one or more first magnetic heads and one or more second magnetic heads that record data on and read data from the magnetic disks;
a first actuator system that moves the one or more first magnetic heads;
a second actuator system that moves the one or more second magnetic heads; and
a controller that:
includes a first controller chip that executes control of the one or more first magnetic heads and the first actuator system, and a second controller chip that executes control of the one or more second magnetic heads and the second actuator system,
executes a process to detect touchdowns of the one or more second magnetic heads after a process to detect touchdowns of the one or more first magnetic heads has completed, and
executes the process to detect the touchdowns of the one or more first magnetic heads at different timings and touchdowns of the one or more second magnetic heads at different timings, wherein
the first controller chip executes the process to detect the touchdowns of the one or more first magnetic heads, and transmits a notification to the second controller chip after the process to detect the touchdowns of the one or more first magnetic heads has completed, and
the second controller chip starts the process to detect the touchdowns of the one or more second magnetic heads in response to the notification.

2. The magnetic disk device according to claim 1, wherein the first controller chip is connectable to a host.

3. A magnetic disk device comprising:
one or more magnetic disks;
one or more first magnetic heads and one or more second magnetic heads that record data on and read data from the magnetic disks;
a first actuator system that moves the one or more first magnetic heads;
a second actuator system that moves the one or more second magnetic heads; and
a controller that:
executes a process to detect touchdowns of the one or more first magnetic heads and a process to detect touchdowns of the one or more second magnetic heads at different timings, and
executes the process to detect the touchdowns of the one or more first magnetic heads at different timings and touchdowns of the one or more second magnetic heads at different timings, wherein the controller
controls the first actuator system and the second actuator system to load the one or more first magnetic heads and the one or more second magnetic heads together, and executes the process to detect the touchdowns of the one or more first magnetic heads and the process to detect the touchdowns of the one or more second magnetic heads at different timings in a state in which the one or more first magnetic heads and the one or more second magnetic heads are loaded together.

4. A magnetic disk device comprising:
one or more magnetic disks;
one or more first magnetic heads and one or more second magnetic heads that record data on and read data from the magnetic disks;
a first actuator system that moves the one or more first magnetic heads;
a second actuator system that moves the one or more second magnetic heads; and
a controller that:
executes a process to detect touchdowns of the one or more second magnetic heads after a process to detect touchdowns of the one or more first magnetic heads has completed, and executes the process to detect the touchdowns of the one or more first magnetic heads at different timings and touchdowns of the one or more second magnetic heads at different timings, wherein the controller
controls the first actuator system and the second actuator system to load the one or more first magnetic heads and the one or more second magnetic heads together, and executes the process to detect the touchdowns of the one or more first magnetic heads and the process to detect the touchdowns of the one or more second magnetic heads at different timings in a state in which the one or more first magnetic heads and the one or more second magnetic heads are loaded together.

5. The magnetic disk device according to claim 1, wherein
the controller
controls the first actuator system and the second actuator system to load the one or more first magnetic heads and the one or more second magnetic heads together, and executes the process to detect the touchdowns of the one or more first magnetic heads and the process to detect the touchdowns of the one or more second magnetic heads at different timings in a state in which the one or more first magnetic heads and the one or more second magnetic heads are loaded together.

6. The magnetic disk device according to claim 3, wherein
the controller controls the first actuator system to load the one or more first magnetic heads, and then controls the second actuator system to load the one or more second magnetic heads.

7. The magnetic disk device according to claim 4, wherein
the controller controls the first actuator system to load the one or more first magnetic heads, and then controls the second actuator system to load the one or more second magnetic heads.

8. The magnetic disk device according to claim 5, wherein
the controller controls the first actuator system to load the one or more first magnetic heads, and then controls the second actuator system to load the one or more second magnetic heads.

9. The magnetic disk device according to claim 3, wherein
after the process to detect the touchdowns of the one or more first magnetic heads and the process to detect the touchdowns of the one or more second magnetic heads have completed, the controller controls the first actuator system to unload the one or more first magnetic heads, and then controls the second actuator system to unload the one or more second magnetic heads.

10. The magnetic disk device according to claim 6, wherein
after the process to detect the touchdowns of the one or more first magnetic heads and the process to detect the touchdowns of the one or more second magnetic heads have completed, the controller controls the first actuator system to unload the one or more first magnetic heads, and then controls the second actuator system to unload the one or more second magnetic heads.

11. A method for controlling a magnetic disk device including one or more magnetic disks, one or more first magnetic heads and one or more second magnetic heads that record data on and read data from the magnetic disks, a first actuator system that moves the one or more first magnetic heads, and a second actuator system that moves the one or more second magnetic heads, the method comprising:
detecting touchdowns of the one or more first magnetic heads at different timings;
detecting touchdowns of the one or more second magnetic heads at different timings; and
executing the detection of touchdowns of the one or more first magnetic heads and the detection of touchdowns of the one or more second magnetic heads at different timings, wherein the method further comprises loading the one or more first magnetic heads and the one or more second magnetic heads together, and the detection of touchdowns of the one or more first magnetic heads and the detection of touchdowns of the one or more second magnetic heads are executed at different timings in a state where the one or more first magnetic heads and the one or more second magnetic heads are loaded together.

12. The method according to claim 11, wherein
the detection of touchdowns of the one or more second magnetic heads is executed after the detection of touchdowns of the one or more first magnetic heads has completed.

13. The method according to claim 11, wherein
the loading of the one or more first magnetic heads and the one or more second magnetic heads together includes:
controlling the first actuator system to load the one or more first magnetic heads; and
controlling the second actuator system to load the one or more second magnetic heads after the loading of the one or more first magnetic heads.

14. The method according to claim 12, wherein
the loading of the one or more first magnetic heads and the one or more second magnetic heads together includes:
controlling the first actuator system to load the one or more first magnetic heads; and
controlling the second actuator system to load the one or more second magnetic heads after the loading of the one or more first magnetic heads.

15. The method according to claim 11, further comprising:
  after the detection of touchdowns of the one or more first magnetic heads and the detection of touchdowns of the one or more second magnetic heads are completed,
  controlling the first actuator system to unload the one or more first magnetic heads; and
  controlling the second actuator system to unload the one or more second magnetic heads after the unloading of the one or more first magnetic heads.

16. A magnetic disk device comprising:
one or more magnetic disks;
a first magnetic head and a second magnetic head that record data on and read data from the magnetic disks;
a first actuator system that moves the first magnetic head;
a second actuator system that moves the second magnetic head; and
a controller that executes a process to detect a touchdown of the first magnetic head and a process to detect a touchdown of the second magnetic head at different timings, wherein
the controller includes a first controller chip that executes control of the first magnetic head and the first actuator system, and a second controller chip that executes control of the second magnetic head and the second actuator system,
the first controller chip executes the process to detect the touchdown of the first magnetic head, and transmits a notification to the second controller chip after the process to detect the touchdown of the first magnetic head has completed, and
the second controller chip starts the process to detect the touchdown of the second magnetic head in response to the notification.

17. A magnetic disk device comprising:
one or more magnetic disks;
a first magnetic head and a second magnetic head that record data on and read data from the magnetic disks;
a first actuator system that moves the first magnetic head;
a second actuator system that moves the second magnetic head; and
a controller that executes a process to detect a touchdown of the first magnetic head and a process to detect a touchdown of the second magnetic head at different timings, wherein
the controller:
  controls the first actuator system and the second actuator system to load the first magnetic head and the second magnetic head together, and
  executes the process to detect the touchdown of the first magnetic head and the process to detect the touchdown of the second magnetic head at different timings in a state where the first magnetic head and the magnetic head are loaded together.

* * * * *

UNITED STATES PATENT AND TRADEMARK OFFICE
CERTIFICATE OF CORRECTION

| | |
|---|---|
| PATENT NO. | : 11,475,914 B2 |
| APPLICATION NO. | : 17/195515 |
| DATED | : October 18, 2022 |
| INVENTOR(S) | : Yoshinari Higashino |

Page 1 of 1

It is certified that error appears in the above-identified patent and that said Letters Patent is hereby corrected as shown below:

In the Claims

Column 18, Line 25, insert --second-- after "and the".

Signed and Sealed this
Fifth Day of December, 2023

Katherine Kelly Vidal
*Director of the United States Patent and Trademark Office*